July 6, 1926.
L. F. DOUGLASS
1,591,296
METHOD AND APPARATUS FOR PRODUCING MULTIPLE IMAGE EFFECTS IN PHOTOGRAPHY
Filed March 25, 1924
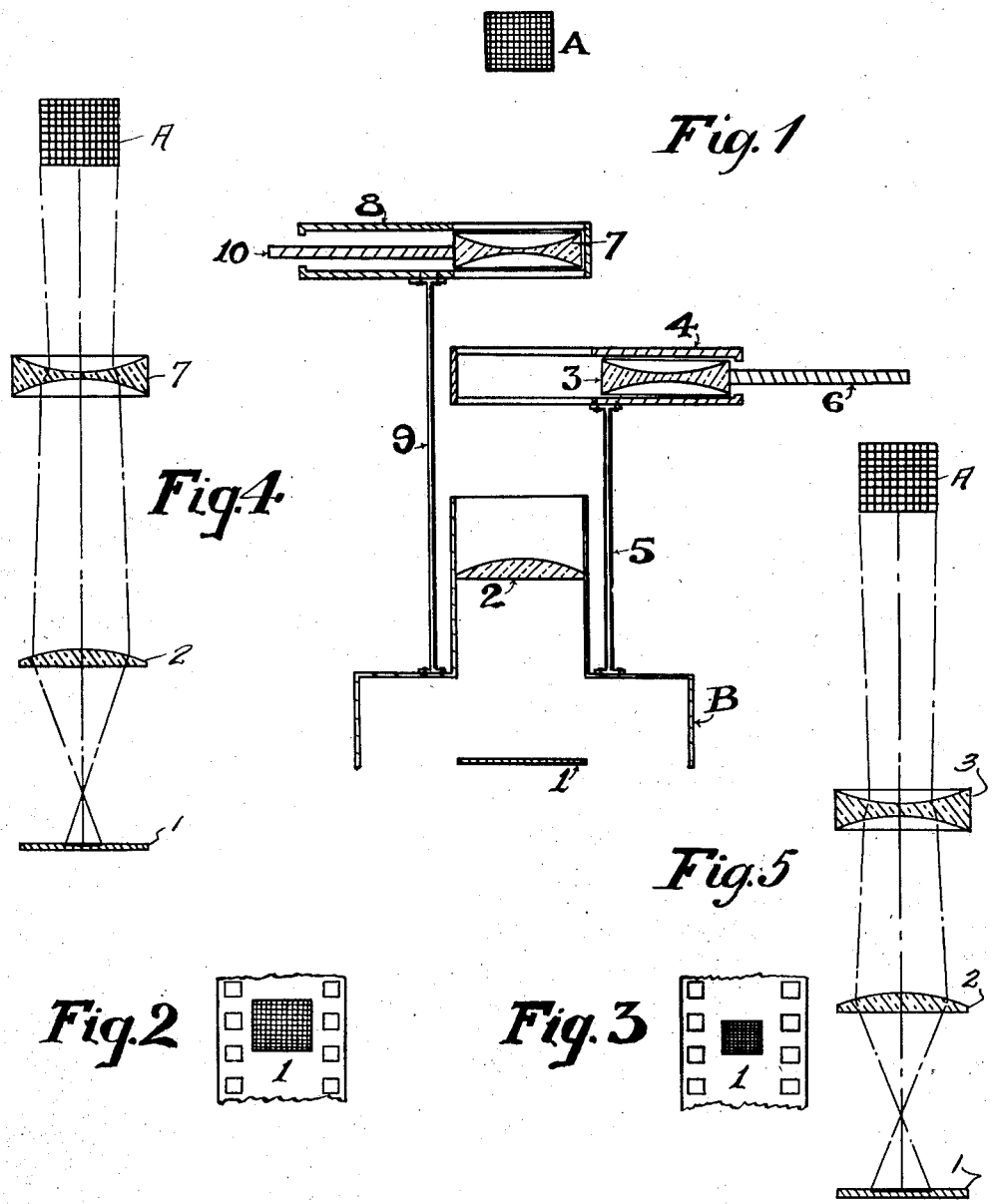
INVENTOR
Leon F. Douglass
BY
J. E. Trabucco
Attorney Patented July 6, 1926.

1,591,296

UNITED STATES PATENT OFFICE.

LEON F. DOUGLASS, OF MENLO PARK, CALIFORNIA.

METHOD AND APPARATUS FOR PRODUCING MULTIPLE-IMAGE EFFECTS IN PHOTOGRAPHY.

Application filed March 25, 1924. Serial No. 701,636.

This invention relates to the method and apparatus for producing multiple image effects in photography, and pertains to a novel method and improved apparatus whereby both an ordinary size and an enlarged image of a single object or scene may be produced on photographic film without alteration or change being made in the position or mechanism of a camera.

An object of my invention is to provide a novel method and improved apparatus whereby an ordinary size image of an object or scene may be produced on a photographic film, and without change in the location or mechanism of the camera and by a successive exposure an enlarged image of the scene or object may be produced on the film.

Another object of my invention is to provide apparatus of the type just characterized which may be readily applied to an ordinary camera without change in the mechanism or construction thereof.

Generally stated, I place in front of the camera lens, two concave lenses of predetermined curvatures, one being positioned at a predetermined distance in front of the other, and each being provided with a suitable mechanism for their movement into or out of operative relation with the camera lens.

I have found that by having the concave lenses of greater curvature a smaller image will be produced, and by decreasing the curvature the image produced will accordingly become larger. I have provided a suitable apparatus which includes two concave lenses located in front of the camera lens at a predetermined distance therefrom, one of the lenses being of greater curvature than the other so that at will the images produced may be made smaller or larger.

The invention is capable of being carried out in a variety of ways, and of receiving a variety of mechanical expressions, some of which will readily suggest themselves to those skilled in the art, but it is to be understood that the limits of my invention will be determined by the claims hereto appended and not by disclosures made on the accompanying drawings.

In the said drawings, in which for the sake of clearness I have omitted the usual parts of the camera:—

Fig. 1 is a horizontal sectional view of a camera illustrating the relative positions of the concave lenses, the camera lens, the photographic film, the manipulating means associated with the concave lenses and the object to be photographed; and Fig. 2 is diagrammatic fragment of a photographic film produced with a concave lens having a relatively less curvature than the other concave lens used in carrying out my invention;

Fig. 3 is a diagrammatic fragment of a photographic film produced with the concave lenses in the position shown in Fig. 1;

Fig. 4 is a diagrammatic view illustrating the relative position of the object to be photographed, one of the concave lenses, the photographic film and the path of the light rays proceeding from the object to the film; and, Fig. 5 is a view similar to Fig. 4, in which is shown the other concave lens.

Referring to Fig. 1 of the drawings, B represents a suitable camera structure in which is embodied in the usual manner, a photographic film or plate 1, and camera lens 2. Positioned about five inches in front of the lens 2 is a double concave lens 3 of approximately 2 diopters, held within a retaining slide 4 that is secured to the camera structure by means of supporting arm 5. So as to provide a suitable means for the movement of lens 3 backward and forward within slide 4, a manipulating bar 6 is securely attached to 3 by any suitable means such as glue. Positioned approximately two and one half inches in front of lens 3 is another concave lens 7 of approximately 10 diopters which is held loosely within retaining slide 8. The slide 8 is held securely in position by supporting arm 9, which is attached securely to the camera structure by means of screws or any other suitable device. Manipulating bar 10 is securely attached to lens 7 by any suitable means such as glue.

In order to move the two concave lenses 3 and 7 either into or out of operative relationship with the camera lens 2, the manipulating bars 6 and 10 are pulled either toward or away from the axis of lens 2, as is desired.

When it is desired to produce an ordinary size image of object or scene A, the lens 7 is moved by means of manipulating bar 10 until it is directly in front of camera lens 2, and concave lens 3 is withdrawn from an operative position by the manipulating bar 6, associated therewith, as shown in Fig. 1. The light rays from object or scene A then proceed through lens 7 and lens 2 onto film 1 where an ordinary size image of said object is produced. If it is desired to produce an enlarged image of object A on film 1, the concave lens 7 is withdrawn from its operative position and the concave lens 3 is placed in the operative position, immediately in front of camera lens 2. When the device is in the position indicated lastly, the image of object or scene A is produced in comparatively enlarged proportions on film 1.

As shown in Fig. 4, the light rays from object or scene A, proceed through concave lens 7 and are refracted thereby through camera lens 2 onto film 1. Fig. 5 shows the path of the light rays proceeding from object A through lens 3 and camera lens 2 onto film 1, the said lens 3 being of less curvature than lens 7, causes the image of object A to be produced on film 1 in larger proportions than is the image produced by means of lens 7.

In transferring the lenses 3 and 7 into and out of operative relationship with the camera lens and in making successive exposures, a blur is caused on one or two frames of the photographic film, thereby necessitating the removal of those particular frames before the scene on the film can be projected with satisfaction.

Although I have shown concave lenses of but two shapes on the drawings, it is evident to those skilled in the art that lenses of other degrees of curvature may be used successfully in carrying out my invention. The term "concave lens" is therefore to be construed as referring to concave lenses of any desired curvature.

My invention is used principally in motion photography or cinematography, and provides a method and apparatus for producing an ordinary image of a scene on a film by one series of exposures, together with a "close up" of the same scene by another series of exposures, it not being necessary in making the exposures to alter or change the position or mechanism of the camera.

The term "object" or "scene", as referred to herein, is to be construed as referring to either one individual object or a group of objects, it being evident that the invention may be successfully used in the photographing of both one object and a group of objects.

Having described my invention what I claim is:

1. The method of producing multiple image effects of an object on a photographic film which comprises the steps of firstly, interposing a concave lens of predetermined curvature at a predetermined distance in front of a camera lens and in the path of the light rays from an object to be photographed, refracting an image of the object through the lens onto the film and making exposures, secondly, removing the said concave lens from the path of the light rays from said object, interposing another concave lens with a different degree of curvature than the first mentioned concave lens at another predetermined distance in front of the camera lens and in the path of the light rays from said object, refracting an image of said object through the camera lens onto the film, and making successive exposures.

2. Means for producing a plurality of varied size images of an object on a photographic film which comprises, in combination with the objective lens of a camera, a plurality of light-refracting concave lenses having different degrees of curvature positioned at different distances in front of the camera lens, and means for moving either of the concave lenses either into or out of operative relationship with the camera lens.

3. Means for producing a plurality of varied size images of an object on a photographic film which comprises, in combination with the objective lens of a camera, a plurality of concave lenses having different degrees of curvature positioned at different distances in front of the camera lens with their axes parallel to the axis of the camera lens, and means for moving the concave lenses, whereby either of them may be brought into or out of operative relationship with the camera lens.

LEON F. DOUGLASS.